United States Patent [19]

Komatsu et al.

[11] Patent Number: 4,906,683
[45] Date of Patent: Mar. 6, 1990

[54] THERMOPLASTIC ELASTOMER COMPOSITION

[75] Inventors: Masato Komatsu, Hanno; Isao Baba, Saitama; Noboru Yamamoto, Tokyo, all of Japan

[73] Assignee: Tonen Sekiyukagaku K.K., Tokyo, Japan

[21] Appl. No.: 236,673

[22] PCT Filed: Mar. 3, 1987

[86] PCT No.: PCT/US87/00447
§ 371 Date: Nov. 2, 1987
§ 102(e) Date: Nov. 2, 1987

[87] PCT Pub. No.: WO87/05309
PCT Pub. Date: Sep. 11, 1987

[30] Foreign Application Priority Data

Mar. 3, 1986 [JP] Japan ................................. 61/44024

[51] Int. Cl.$^4$ .......................... C08L 23/00; C08F 8/00
[52] U.S. Cl. ..................................... 524/528; 525/373; 525/194; 525/195; 525/232; 525/196; 525/237; 525/192
[58] Field of Search ............... 525/373, 194, 195, 232, 525/192, 190, 237; 524/528

[56] References Cited

U.S. PATENT DOCUMENTS

| 4,166,892 | 9/1979 | Maeda et al. | 525/373 |
| 4,728,692 | 3/1988 | Sezaki et al. | 525/74 |
| 4,801,651 | 1/1989 | Komatsu et al. | 525/211 |

OTHER PUBLICATIONS

Polymer Blends, edited by D. R. Paul, vol. 2, Academic Press, New York, San Francisco, London 1978, pp. 293–294, and 304–314.

Primary Examiner—Joseph L. Schofer
Assistant Examiner—Peter D. Mulcahy
Attorney, Agent, or Firm—W. G. Muller

[57] ABSTRACT

Partially crosslinked thermoplastic elastomer which is produced as follows:

(A) propylene (10–90 weight part), (B) halogenated butyl rubber (90–10 weight part), (A)+(B)=100 weight part), (C) olefinic rubber (10–120 weight part) and (D) mineral oil softening agent (5–120 weight part) are heated in the presence of (E) metal oxide and/or metal chloride.

To the composition based on (A)–(E) (100 weight part), (F) polyolefin (300–1900 weight part) and (G) styrenic rubber (50–1100 weight part) are blended.

The composition has particularly good moldability, compatibility, low temperature impact strength, and gloss, and can be used for large scale molding.

1 Claim, No Drawings

THERMOPLASTIC ELASTOMER COMPOSITION

BACKGROUND OF THE INVENTION

This invention is related to partially crosslinked olefinic thermoplastic elastomers (TPEs).

Although compounds comprising a polyolefin and a partially crosslinked rubber possess good properties as TPEs such as heat resistance, mechanical strength, flexibility, and elasticity, their flow properties are inferior to those of common plastics, and this has limited their use in large molded parts owing to problems such as "flow marks." To improve these problems, for example, Japanese Patent 54-23702 teaches the use of compounds consisting of polyolefin and two types of rubber, partially crosslinked, and Japanese Patent 56-15743 teaches a compound in which a polyolefin is blended with a polyolefin/rubber blend that has been treated with organic peroxides. Also Japanese Patent 56-15740 teaches the methods of manufacture of such compounds. On the other hand, as examples of TPEs containing styrenic rubber, Japanese Patent Application 59-6236 discloses compositions containing, for example, hydrogenated derivatives of styrene-conjugated diene copolymers, peroxide-crosslinked olefinic rubbers, uncrosslinked hydrocarbon rubbers and inorganic fillers and manufacturing processes for these, and Japanese Patent Application 60-166339 discloses partially crosslinked compositions consisting of hydrogenated derivatives of styrene-conjugated diene copolymers, rubber softening agents, peroxide decomposing type olefinic resins and conjugated diene rubbers. However, the peroxides used in the manufacture of the above partially crosslinked TPEs are highly reactive, making it difficult to control the degree of crosslinking, and in addition because chain scission occurs simultaneously, the compound physical properties become poor, the resulting low molecular weight species lead to poor paintability and partial gelation leads to a poor surface appearance. In addition, there have been problems of poor heat stability due to the free radicals remaining from the organic peroxide.

In order to resolve these problems, the inventors have blended halobutyl rubber into the rubber component, and have proposed compositions with a polyolefin added to a rubber component/polyolefin that are partially crosslinked using metal oxides (MOx) and/or metal chlorides (MCl) (Japanese Application 60-188419).

Although the abovementioned compositions possess good properties as TPEs, they are inadequate in gloss to give a high quality appearance compared to polyurethane and polyester TPEs. It is one objective of this invention to improve the gloss of molded parts without loss in the advantages of TPE polyolefin compounds, i.e. elasticity, and flow and mechanical properties suitable for large molded parts.

SUMMARY OF THE INVENTION

Compositions in which polyolefin and a styrenic rubber are added to a blend comprising polyolefin and a partially crosslinked rubber phase comprising halobutyl rubber, said partial crosslinking achieved using MOx and/or MCl as a vulcanizing agent. The resulting composition is a TPE which comprises a mixture of (A) Polypropylene 10–90 parts, (B) halobutyl rubber 90–10 parts (A+B=100 parts), (C) olefinic rubber 10–120 parts and (D) mineral oil softener which blend of (A) through (D) is thermally treated with (E) MOx and/or MCl and is blended uniformly with (F) polyolefin 30–1900 parts and (G) styrenic rubber 50–1100 parts.

DETAILED DESCRIPTION (A) Polypropylene (PP)

PP suitable for use in this invention includes homopolymer or copolymer with ethylene, 1-butene, 1-pentene, 1-hexene or 4-methylpentene or other alpha-olefins with propylene as the main component, including random or block copolymers. Melt flow rate (MFR) is about 0.3–60 g/10 min, preferably 1–40, most preferably 3–30. Component A of the composition has the highest melting point of polyolefins, and imparts heat resistance and improved mechanical properties to the compound.

(B) Halobutyl Rubber

For purposes of this invention halobutyl rubber means halogenated butyl rubber. The halogen can be chlorine or bromine, usual content is 0.5–4.0 wt%. It is preferable that this component has a Mooney Viscosity, ML 1+8 (100° C.) of about 30–100 and 0.5–4.0 mol% unsaturation. Halobutyl rubber can be crosslinked using MOx and/or MCl, and exists as a dispersed crosslinked rubber phase, imparting abrasion resistance, impermeability and "anti-slip properties" to the compound.

(C) Olefinic Rubber

Rubber in which two or more of: ethylene, propylene, butene, 1-hexene, 4-methyl-1-pentene, etc. are copolymerized (e.g., ethylene propylene rubber, EPR) or rubber in which two of the above monomers (preferably ethylene and propylene) are polymerized with dicyclopentadiene, 1,4-hexadiene, cyclooctadiene, methylene-norbornene or ethylidenenorbornene (ENB) or conjugated dienes such as butadiene or isoprene. The preferred olefinic rubber has Mooney Viscosity, ML 1+8 (127°), of 5–300, Iodine Value up to 30, and 35–85 wt% ethylene content. Such olefinic rubber may be polyisobutylene, butyl rubber, etc.

The olefinic rubber is present in the compound as a non-crosslinked rubber, and imparts flexibility, flowability and also acts as a blender at the interface of (A) and (B), improving tensile strength and elongation.

(D) Mineral Oil Softener

Suitable materials include hydrocarbon petroleum fraction which lessens the hardness of vulcanized rubber. Included are paraffinic, naphthenic, and aromatic types. Among these, aromatic oils have a detrimental effect on paintability, and are unsuitable for use in materials which will be painted.

(E) Vulcanizing Agents

Metal oxides (MOx) including zinc oxide, magnesium oxide, lead oxide, calcium oxide, etc., but zinc oxide is preferred. Among metal chlorides (MCl) are zinc chloride and stannic chloride. It is also desirable to use magnesium oxide as an accelerator, to avoid corrosion of molds due to generation of free halogen. The amount of vulcanizing agents relative to 100 parts of (A)+(B)+(C)+(D) should be about 0.2–10 parts, preferable 1 to 5 parts.

(F) Polyolefin

Polyolefin useful in this invention include homo- or copolymers of two or more of ethylene, propylene, 1-butene, 1-pentene, 1-hexene, 4-methyl-1-pentene, or copolymers of vinyl esters, unsaturated carboxylic acids or their derivatives with any of the above. Random or block copolymers are encompassed. Melt flow rate, MFR (at 190° C., but 230° C. for propylene-based polymers) should be in the range of about 0.1–20 g/10 min.

for ethylene-based and about 15–60 g/10 min. for propylene-based polymers. Also, two or more of the above polyolefins may be combined. Preferred among the above are low density polyethylene (LDPE), linear low density polyethylene (LLDPE), medium-density polyethylene (PE) or high density polyethylene (HDPE), polypropylene (PP), or random or block copolymers with propylene as the major component. The presence of polyolefin improves the flowability or paintability of the compounds of the present invention without detriment to rubber elasticity. Since (F) and (A) have a similar function, these components can be added in various ratios. However, the beneficial effect of (F) is particularly observed when it is used with the previously dynamically vulcanized blend of (A)–(D) (in other words heat treated with mixing in the presence of vulcanizing agents).

(G) Styrenic Rubber

Random or block copolymer of styrene with butadiene, isoprene, etc. Examples include styrene butadiene rubber (SBR), styrene butadiene styrene (SBS), styrene isoprene styrene (SIS), hydrogenated SBS (SEBS), and hydrogenated SIS. The styrenic rubber desirably has a Mooney Viscosity, ML 1+4 (100° C.) of about 10 to 200, and styrene content of about 5–70 wt%.

Styrenic rubber improves the gloss of the final compound without detriment to the properties of olefinic TPEs. This effect of (G) is particularly observed when added following the partially dynamically vulcanized blend of (A)–(D).

(H) Other (Optional) Components

As necessary for the particular end use, other optional components can be added to the composition including ethylene propylene rubber, polybutadiene-type rubbers, ethylene propylene diene monomer (EPDM) rubber or oil-resistance enhancing nitrile rubbers or other synthetic or natural rubbers. Also, modified polyolefins reacted with unsaturated carboxylic acids or their derivatives, e.g., maleic anhydride, endo-bicyclo-(2,2,1)-5-heptane-2,5-dicarboxylic anhydride may be incorporated. Other components such as antioxidants, UV absorbers, metal aging retardants, antistatic agents, lubricating agents, electrical property improvers, process aids, flame-retardants or coloring agents and inorganic fillers such as talc, barium sulfate, mica, and calcium silicate fillers may be added as required. These may be added at any stage of the manufacturing process.

Ratios of Components

All parts (pts.) are by weight
(A) 10–90 pts., preferably 20–70 pts.;
(B) 10–90 pts., preferably 30–80 pts., such that (A)+(B)=100 pts.;
(C) 10–120 pts., preferably 10–100 pts.;
(D) 5–120 pts., preferably 5–100 pts.

The preferred amount of (E) (vulcanizing agent) is 0.2–10 pts. per 100 pts. of (A)+(B)+(C)+(D), especially preferred is 1–5 pts. When (A) is less than 10 pts., mechanical strength and heat resistance are poor. When (A) is greater than 90 pts., hardness and compression set become higher and elastomeric properties are lost. When (C) is less than 10 pts. flexibility and flowability are poor; additionally, the compatibility of (A) and (B) is not as good. When (C) is greater than 120 pts., mechanical strength decreases and compression set increases. When (D) is less than 5 pts., flexibility is inadequate and if (D) is greater than 120, paintability becomes poor, mechanical strength decreases and compounds are sticky. The amount of (F) relative to 100 pts. of the partially vulcanized composition is preferably 30–1900 pts., preferably 40–1800 pts. At (F) less than 30 pts. the improvement in paintability and flowability is inadequate, while at (F) greater than 1900 pts. the flexibility and rubbery properties of the compound are detrimentally affected. The amount of (G) relative to 100 pts. of the vulcanizate is 50–1100 pts. preferably 50–1000 pts. When (G) is less than 50 pts. there is no improvement in the gloss of the compound while if (G) is greater than 1100 pts. the compound loses its desirable physical properties. Among the other components, it is desirable for the compound to have about 0–16 wt% of synthetic or natural rubber. It is desirable for the compound to contain about 0–20 wt% of modified polyolefin.

Method of Manufacturing the Composition

In preparing the composition of the invention, first, components (A), (B), (C), (D), and (E) (vulcanizing agent, MOx and/or MCl) plus other components, if necessary, are thermally treated, i.e., blended above the melting point of the components. Blending is usually at a temperature of 160°–250° C., desirably 170°–220° C., for about 1–10 minutes, preferably 3–5 minutes. In this way, it is possible to make a partially vulcanized composition in which the dispersed phase (B) is selectively crosslinked. The melting/blending step can be carried out in conventional equipment such as pressure kneaders, Banbury mixers, or screw-type extruders. This can be conveniently referred to as First Stage mixing.

Next, the partial vulcanizate obtained as above is blended uniformly with components (F) and (G). To do this, preferably pellets of each component can be premixed in a Henschel Mixer, ribbon blender, etc. and then blended in the melt in an extruder, Banbury or kneader. At this time, other necessary components, such as nitrile or other synthetic rubbers, modified polyolefin, various stabilizers, coloring agents, fillers, etc. can be added. This is conveniently referred to as Second Stage mixing.

Owing to the fact that component (B) is partially crosslinked, the compound has good compatability, physical properties are high without detriment to rubbery properties, and low-temperature impact resistance is improved. Also, owing to the uniform incorporation of (F) and (G), paintability, flowability, and adhesion are good, and hence there are no flow marks in large, molded parts and a product of good gloss and appearance is obtained. In addition, the vulcanizing agent (E) is safe and thermally stable compared to organic peroxides, so the degree of crosslinking can be readily adjusted. Thus, there is no molecular weight degradation due to polypropylene chain scission, and, due to the absence of free-radicals resulting from organic peroxides, heat resistance is excellent. Despite these improvements, cost is lower than polyurethane products, and it is possible to obtain physical properties and high-quality gloss comparable to large molded polyurethane parts. The compound at this invention can be processed easily by the usual techniques for TPEs, e.g., blow molding, extrusion, and injection molding. The compound of the present invention has an excellent balance of flexibility, strength, and heat resistance, and is easily processable, so is especially useful for automotive parts, e.g., rack and pinion boots, side-moldings, hoses, spoilers, and bumpers.

EXAMPLES

Test Methods (1) MFR: JIS K7210 (wt. 2.16 kg, 230° C).
(2) MI: JIS K7210 (wt. 2.16 kg, 190° C.).
(3) Tensile strength and elongation at break: JIS K7113.
(4) Bending modulus: JIS K7203.
(5) Izod impact: JIS K7110.
(6) Gloss: JIS K7105, measured on 60° plane.
(7) Heat deflection temperature: JIS K7207.
(8) Processability:
  (a) Conditions
   Inj. molder: Mitsubishi Natco 350 MV XL40
   Inj. molding temperature: 230° C.
   Inj. molding pressure: primary 800 kg/cm²
   Inj. molding pressure: secondary 500 kg/cm²
   Inj. time: 13 seconds
   Cycle: 38 seconds
   Gate: ride gate
   Part: 3×100×350 mm flat plate
  (b) Judgement
   Flow-marks O: none
   Flow-marks D: very little
   Flow-marks X: many, severe
(9) Paintability:
  (a) Primer method
   After test piece was cleaned in trichloroethylene (TCE) vapor for one minute, primer ("Plagloss," Nippon Yushi Co.) was painted and treated at 120° C. for 30 minutes. Then, over this layer was painted upper coating ("Flexene 101," Nippon Paint Co.), and treated at 120° C. for 30 minutes.
  (b) Plasma method
   After test piece was cleaned in TCE vapor for one minute, it was plasma treated ($O_2$ plasma, 1.0 KW×1.0 torr×60 seconds) and painted with an upper coating ("Flexene 101," Nippon Paint Co.), and treated at 120° C. for 30 minutes.
  (c) Evaluation
   Initial adhesion: according to JIS K5400 test, "tile".
   Resistance to warm water: Appearance and "tile" test after immersion in 40° C. water for 240 hrs.

Examples of the invention 1–18; comparative examples 1, 2.

Materials Used

Component (A) Propylene-ethylene block copolymer (MFR=15.0 g/10 min., ethylene 7 wt%), referred to as "PP-Block-1."
(B) Chlorobutyl rubber (ML 1+8 (100)=50, chlorine content 1%, 2 mol% unsat.), referred to as "CIIR."
(C) ENB-EPDM (ML 1+8 (127)=35. Iodine Valve=4.0, ethylene=65 wt%), referred to as "EPDM-1."
(D) Naphthenic process oil (viscosity-specific gravity coefficient=0.880), referred to as "softener."
(E) ZnO, MgO (halogen accelerator).
(F) Propylene-ethylene block copolymer (MFR 40=g/10 min., ethylene content=7 wt%), referred to as "PP-Block-2"; HDPE (density 0.945 g/cm³, MI=0.35 g/10 min.), referred to as "HDPE"; LLDPE (density=0.918 g/cm³, MI=2.0 g/10 min.), referred to as "LLDPE."
(G) SEBS block copolymer-Shell Chemical Co., Kraton G1657, (solution viscosity at 25° C.=1100 cp, 20 wt% toluene solution), referred to as "SEBS"; SBR-JSR 1778N, (ML 1+4 (100)=46), referred to as "SBR."
Other: Talc (silane treated, avg. dia. 2.5 microns), EPDM rubber, (ML 1+8 (127)=45, iodine value=3, ethylene=65 wt%), referred to as "EPDM-2"; EPR (ML 1+4 (100)=24, ethylene 73 wt%), referred to as "EPR", MA-modified propylene-ethylene block copolymer (MA content 0.5 wt%), referred to as "CMPP"; acrylonitrile-butadiene rubber (ML 1+4 (100)=56, AN content=35%), referred to as "NBR".

Preparation of the Compositions

Of the above components, (A)–(D) and talc were formulated as per Table 1, and to 100 pts. of this mixture were added zinc oxide, 2 pts. and magnesium oxide, 0.5 pts., and the blend was mixed in a Banbury Mixer at 170° C. for 3 minutes, then sheeted, cut, and pelletized. (Stage 1).

To the pellets obtained in Stable 1 were added (F), (G), and CMPP and NBR as per Table 1. After premixing in a Henschel Mixer, the blend was fed to a twin-screw extruder and extruded at 200° C., to obtain the desired compound (Stage 2).

The characteristics of each compound are given in Table 1. Also, paintability results both for initial adhesion and warm water resistance were 100/100 in each case.

For comparison, comparative example 1 shows a case in which only (F) was added, comparative example 2 shows a case in which EPR was added instead of (F) and (G) to the partial vulcanizate resulting in Stage 1. Properties of the compounds are shown in Table 1.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Stage 1 | | | | | | | | | | | |
| PP-Block-1 (pts.) | 50 | 50 | 50 | 50 | 50 | 50 | 50 | 50 | 50 | 50 | 50 |
| CIIR (pts.) | 50 | 50 | 50 | 50 | 50 | 50 | 50 | 50 | 50 | 50 | 50 |
| EPDM-1 (pts.) | 100 | 100 | 100 | 100 | 100 | 100 | 100 | 100 | 100 | 100 | 100 |
| Softener (pts.) | 94 | 94 | 94 | 94 | 94 | 94 | 94 | 94 | 94 | 94 | 94 |
| Talc (pts.) | 19 | 19 | 19 | 19 | 19 | 19 | 19 | 19 | 19 | 19 | 19 |
| Stage 2 | | | | | | | | | | | |
| PP-Block-2 (pts.) | 5,630 | 5,310 | 4,060 | 3,440 | 2,810 | 1,880 | 780 | 235 | 125 | 1,880 | 1,570 |
| (pts.) | — | — | — | — | — | — | — | — | — | — | HDPE 310 |
| (pts.) | SEBS 310 | SEBS 630 | SEBS 1,880 | SEBS 2,500 | SEBS 3,130 | SEBS 940 | SEBS 470 | SEBS 235 | SEBS 190 | SBR 940 | SEBS 940 |
| Fundamental Properties | | | | | | | | | | | |

TABLE 1-continued

|  | | | | | | | | | | |
|---|---|---|---|---|---|---|---|---|---|---|
| MFR (g/10 min.) | 7 | 8 | 11 | 13 | 18 | 10 | 9 | 7 | 5 | 8 | 8 |
| Flex. Mod. (kg/cm$^2$) | 6,500 | 6,100 | 4,300 | 3,900 | 3,500 | 4,500 | 4,200 | 4,100 | 4,100 | 5,300 | 5,500 |
| Tens. @ Break (kg/cm$^2$) | 165 | 160 | 132 | 115 | 103 | 130 | 125 | 110 | 98 | 110 | 108 |
| Elong. @ Break (%) | 290 | 295 | 300+ | 300+ | 300+ | 300+ | 300+ | 300+ | 300+ | 300+ | 300+ |
| Room Temp. IZOD | NB | NB | NB | NB | NB | NB | NB | NB | NB | NB | NB |
| (kg-cm/cm) @ −40° C. | 10 | 25 | 45 | 58 | 71 | 43 | 47 | 50 | 53 | 45 | 47 |
| Heat Distort. Temp. (°C.) | 68 | 63 | 60 | 54 | 51 | 59 | 56 | 52 | 52 | 61 | 60 |
| Processability | | | | | | | | | | | |
| Flow Marks | 0 | 0 | 0 | 0 | 0 | 0 | 0 | 0 | 0 | 0 | 0 |
| Gloss (%) | 43 | 55 | 61 | 75 | 83 | 55 | 52 | 45 | 40 | 58 | 68 |

|  | Ex. 12 | Ex. 13 | Ex. 14 | Ex. 15 | Ex. 16 | Ex. 17 | Ex. 18 | Comparative Ex. 1 | Comparative Ex. 2 |
|---|---|---|---|---|---|---|---|---|---|
| Stage 1 | | | | | | | | | |
| PP-Block-1 (pts.) | 50 | 50 | 50 | 50 | 50 | 50 | 60 | 50 | 50 |
| CIIR (pts.) | 50 | 50 | 50 | 50 | 50 | 50 | 40 | 50 | 50 |
| EPDM-1 (pts.) | 100 | 100 | 100 | 100 | 100 | 100 | 110 | 100 | 100 |
| Softener (pts.) | 94 | 94 | 94 | 94 | 94 | 94 | 94 | 94 | 94 |
| Talc (pts.) | 19 | 19 | 19 | 19 | 19 | 19 | 19 | 19 | 19 |
| Stage 2 | | | | | | | | | |
| PP-Block-2 (pts.) | 1,570 | 1,570 | 1,570 | 1,880 | 4,060 | 1,880 | 2,810 | 990 | 1,880 |
|  | LLDPE | EPR | EPDM-2 | CMPP | NBR | CMPP | — | — | EPR |
| (pts.) | 310 | 310 | 310 | 5 | 630 | 5 | — | — | 940 |
|  | SEBS | SEBS | SEBS | SBR | SEBS | SEBS | SEBS | — | — |
| (pts.) | 940 | 940 | 940 | 940 | 1,260 | 940 | 3,130 | — | — |
| Fundamental Properties | | | | | | | | | |
| MFR (g/10 min.) | 10 | 7 | 5 | 8 | 10 | 10 | 18 | 10 | 9 |
| Flex. Mod. (kg/cm$^2$) | 4,300 | 3,800 | 3,900 | 5,300 | 4,400 | 5,200 | 3,700 | 7,500 | 6,500 |
| Tens. at Break (kg/cm$^2$) | 95 | 92 | 95 | 108 | 138 | 110 | 109 | 132 | 125 |
| Elong. @ Break (%) | 300+ | 300+ | 300+ | 300+ | 300+ | 300+ | 300+ | 150 | 200 |
| Room Temp. IZOD | NB | NB | NB | NB | NB | NB | NB | NB | NB |
| (kg-cm/cm) @ −40° C. | 63 | 65 | 67 | 62 | 42 | 52 | 65 | 15 | 19 |
| Heat Distort. Temp. (°C.) | 55 | 51 | 53 | 61 | 60 | 61 | 55 | 55 | 51 |
| Processability | | | | | | | | | |
| Flow Marks | 0 | 0 | 0 | 0 | 0 | 0 | 0 | 0 | 0 |
| Gloss (%) | 63 | 61 | 60 | 59 | 58 | 62 | 86 | 31 | 35 |

NB = No Break.

What is claimed is:

1. A partially crosslinked thermoplastic elastomer which is produced by thermally blending: (A) 10–90 weight part polypropylene, (B) 90–10 weight part halogenated butyl rubber wherein (A)+(B)=100 weight part, (C) 10–120 weight part non-crosslinked olefinic rubber and (D) 5–120 weight part mineral oil softening agent, said thermal blending in the presence of (E) metal oxide and/or metal chloride, followed by blending with 100 weight part of the composition comprising (A) through (E), (F) 30–1,900 weight part polyolefin based on ethylene or propylene such that said polyolefin has a Melt Flow Rate of 0.1–20 g/10 min. at 190° C., for ethylene based polymer, or 15–60 g/10 min. at 230° C. for propylene based polymer, and (G) 50–1,100 weight part styrenic rubber wherein said styrenic rubber is a random or block copolymer of monomers selected from the group consisting of styrene, butadiene and isoprene.

* * * * *